A. P. Barlow.
Saw-Mill.
N° 72,155. Patented Dec. 17, 1867.
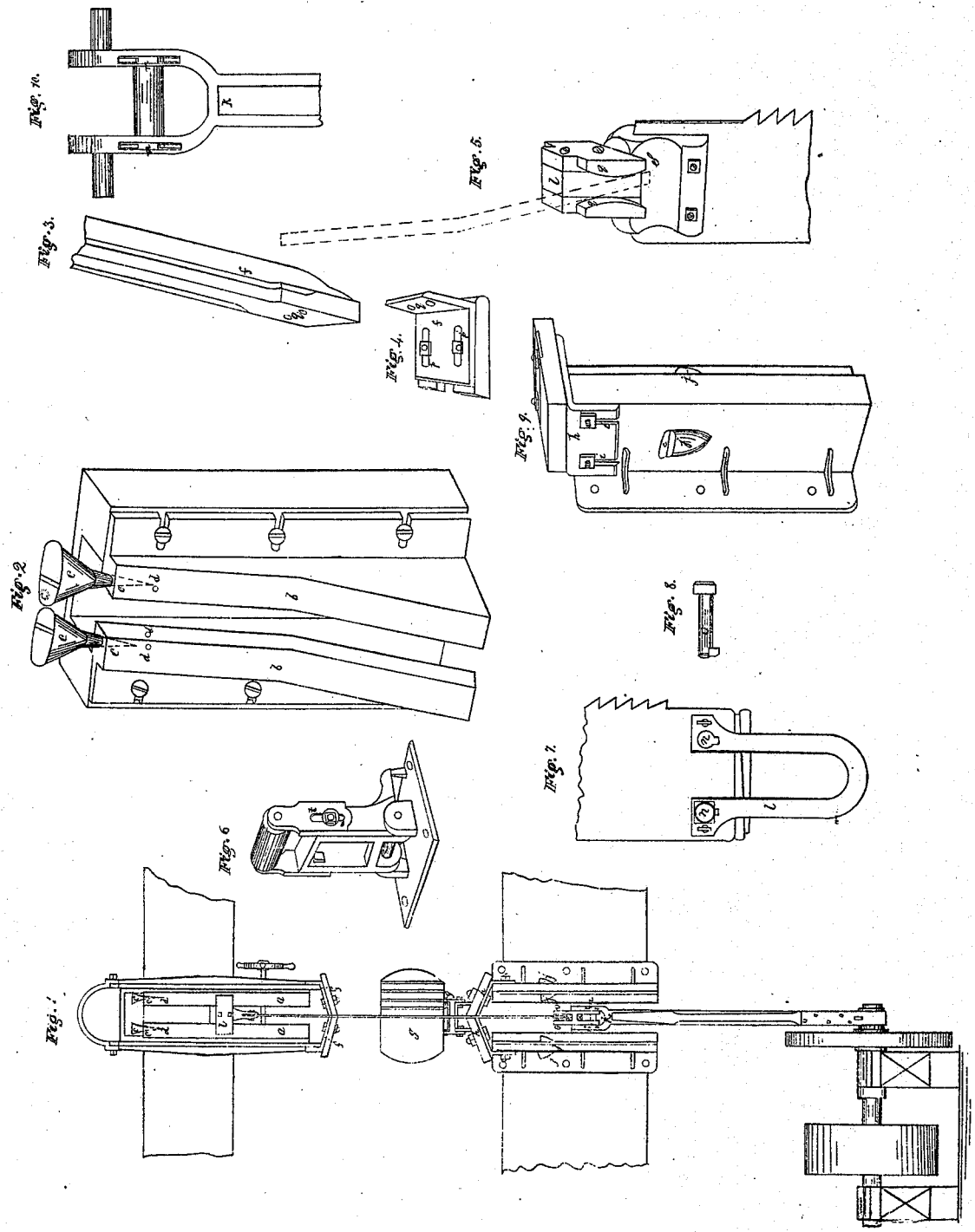

UNITED STATES PATENT OFFICE.

ASHBEL P. BARLOW, OF CLAREMONT, NEW HAMPSHIRE.

IMPROVEMENT IN SAW-MILLS.

Specification forming part of Letters Patent No. 72,155, dated December 17, 1867.

*To all whom it may concern:*

Be it known that I, ASHBEL P. BARLOW, of Claremont, in the county of Sullivan and State of New Hampshire, have invented a new and Improved Mode of Hanging Single Upright or Gang Saws, entitled Rotary Cutting Self-Lubricating Upright Saws; and I do hereby declare that the following is a full and exact description of the same, reference being had to the annexed drawings making a part of this specification, in which—

Figure 1 shows a front view, showing the full machine as it appears when ready to work.

I use the common muley-saw frame with my improvements, which I wish to secure. $a\ a$ are inclined guides or slides, which are required to incline back from the center $b\ b$, in Fig. 2, toward the top one-half ($\frac{1}{2}$) inch and forward at the bottom one (1) inch, so that when the saw ascends they carry the saw back more rapidly at the beginning of its upstroke, in such manner as at the outset to clear the timber in its ascent. In other words, the parallel ways or guides are formed with two right-lined inclines each, the first or lower ones receding from the bottom to a point at or near the center of the length of the ways, where they intersect the second inclines, also receding, but less rapidly, from the point of intersection to the top of the guides, in such manner as to give to the upper end of the upright saw, in its downward or effective stroke, a continuously-advancing movement at a varying speed, which, as will be seen by inspection of the drawings, (see red lines, Fig. 5,) is most rapid from the center downward, for the purpose of compensating for the receding movement of the lower end of the saw, beginning at that point, and due to the manner of attaching the saw to the "hollow pitman," Fig. 10. By this arrangement I am enabled to give to the saw an equal cutting or advancing movement against the timber during its entire downward or effective stroke, and at the same time, by reason of the continued retreating movement of the lower end of the saw until it reaches the center of its upstroke, and the action of the inclined guides or ways upon the upper end, the saw-teeth are withdrawn instantly and bodily from contact with the timber at the beginning of the ineffective or up stroke. $c\ c\ c\ c$ show oil-cups, with holes or slots drilled in the top of slides, so that when the cups are filled with oil it runs slowly out of the holes on the face of slides at $d\ d\ d$, in Figs. 1 and 2. $e\ e$, in Figs. 1 and 5, show the cross-head, which attaches the saw to the slides or guides, and in passing over them takes up the oil at $d\ d$ and distributes it over the slide. $f\ f\ f\ f$, in Figs. 1, 3, and 4, show an improvement in the common gyves, to hold the saw steady in its rapid motion through the log. $g\ g$ show a section of log, with an adjustable roll to hold the log from springing downward while the saw is cutting in its downward motion. $h\ h\ h$, in Figs. 1 and 9, show gyves fastened on top of lower muley-head by means of slots, as shown at $i\ i$, in Fig. 9. $j\ j\ j\ j\ j$, in Figs. 1 and 9, show oil or tallow cups, from which the oil or tallow is conveyed, by means of holes drilled through the sides of the castings and lower slides, to the blocks which hold the top of the pitman, when they become dry or heated by the rapid motion. $k$ represents a hollow pitman, in which the saw is fastened at the bottom by means of saw-buckle $l$, as shown in Fig. 7. $m\ m$ are slots in side of hollow pitman to put keys in, for the purpose of adjusting the saw in its motion up and down, and giving it a rotary cutting motion in connection with the inclined slides. $n\ n$, in Fig. 7, show slotted holes in saw-buckle, to put in gib-bolts $o$, Fig. 8, in place of screw-nuts, as they would become loose and lose off, besides the inconvenience of putting them on in so small a space. $p\ p$, in Fig. 4, show slotted holes, through which bolts are put, to hold pieces of wood to steady the saw in its course. $q\ q$, in Figs. 3 and 4, show bolt-holes, by which the foot is fastened to the upright arms. $r\ r$, in Fig. 5, show curved lips, which are fastened to cross-head $e$, and guide the saw up the inclined gyves. The object of the curved lips is to prevent the sharp edges from scraping off the oil or tallow that is put on by means of the oil or tallow cups. The oval frame spreads the oil or tallow over the slide, and makes it last much longer. $s$ represents a curved jaw in cross-head, to enable it to spring and clasp the saw firmly without having to break the thread off from bolts while tightening the nut.

What I claim as my invention, and desire to secure by Letters Patent, is—

1. The ways or guides b, constructed with the double inclines and parallel sides, substantially as shown and described.

2. The cross-head, cut away, as shown at s, and provided with the lips having the convex faces r r, constructed and operating substantially as and for the purpose set forth.

3. The saw-buckle, perforated and slotted, as described, in combination with the gib or key bolts o, as set forth.

4. The hollow pitman, slotted at m, and provided with adjusting-keys for varying the distance of the saw-pivot from the pitman-fulcrum, in the manner and for the purpose set forth.

ASHBEL P. BARLOW.

Witnesses:
IRA COLBY, Jr.,
O. B. WAY.